(12) United States Patent
Papastergiou et al.

(10) Patent No.: US 8,525,366 B2
(45) Date of Patent: Sep. 3, 2013

(54) DC POWER SOURCE FOR A HIGH VOLTAGE POWER APPARATUS

(75) Inventors: Konstantinos Papastergiou, Geneva (CH); Willy Hermansson, Vasteras (SE); Georgios Demetriades, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/492,093

(22) Filed: Jun. 8, 2012

(65) Prior Publication Data

US 2012/0242153 A1    Sep. 27, 2012

Related U.S. Application Data

(63) Continuation of application No. PCT/EP2009/066865, filed on Dec. 10, 2009.

(51) Int. Cl.
*H04B 3/54* (2006.01)

(52) U.S. Cl.
USPC .................................................. 307/5; 307/6

(58) Field of Classification Search
USPC ......................................................... 307/5.6
See application file for complete search history.

(56) References Cited

U.S. PATENT DOCUMENTS

| | | | |
|---|---|---|---|
| 2,887,647 A | 5/1959 | Strozier | |
| 5,798,916 A | 8/1998 | Stacey et al. | |

FOREIGN PATENT DOCUMENTS

| | | |
|---|---|---|
| EP | 0609101 A1 | 8/1994 |
| EP | 1156573 A2 | 11/2001 |
| WO | 9627230 A1 | 9/1996 |
| WO | 2008002223 A1 | 1/2008 |

OTHER PUBLICATIONS

International Search Report and Written Opinion of the International Searching Authority; Application No. PCT/EP2009/066865; Issued: Mar. 10, 2011; Mailing Date: Mar. 21, 2011; 15 pages.

*Primary Examiner* — Robert L. Deberadinis
(74) *Attorney, Agent, or Firm* — St. Onge Steward Johnston & Reens LLC

(57) ABSTRACT

A dc power source for a high voltage power apparatus, the dc power source including one or more strings including a plurality of dc power source units connected in series, and switches configured to connect and disconnect said strings. The switches are solid-state switches distributed among the power source units of each string, and all solid-state switches in the string are arranged so that they are turned on and off simultaneously. Each switch is connected in parallel with a first controllable semiconductor in a first direction and connected in parallel with a second controllable semiconductor in a second direction which is opposite to the first direction, and the dc power source includes a control unit configured to bypass a failed switch by triggering the forward biased of the first or second controllable semiconductor connected to the failed switch in case a fault in the switch is detected.

6 Claims, 2 Drawing Sheets

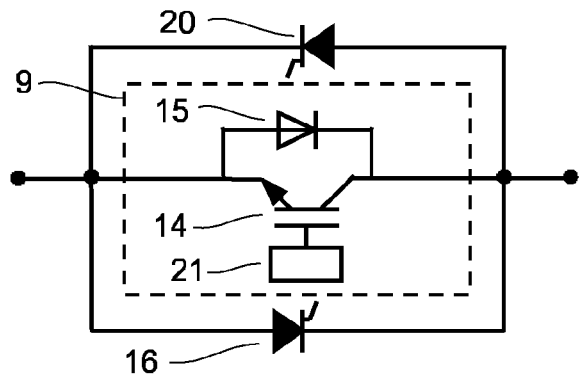
*Figure 2* a
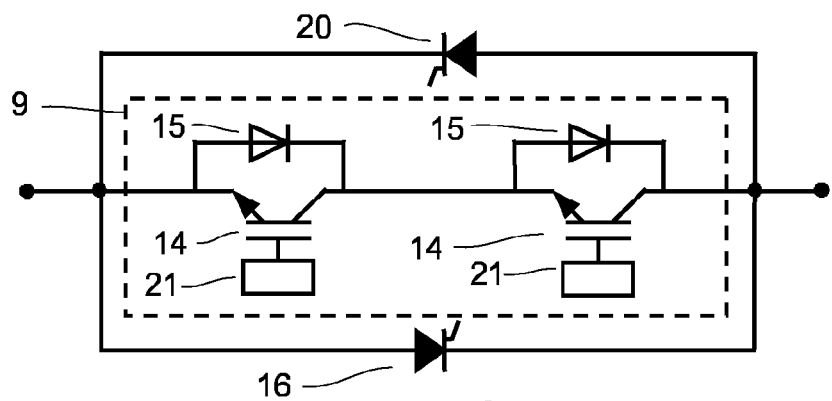
*Figure 2* b
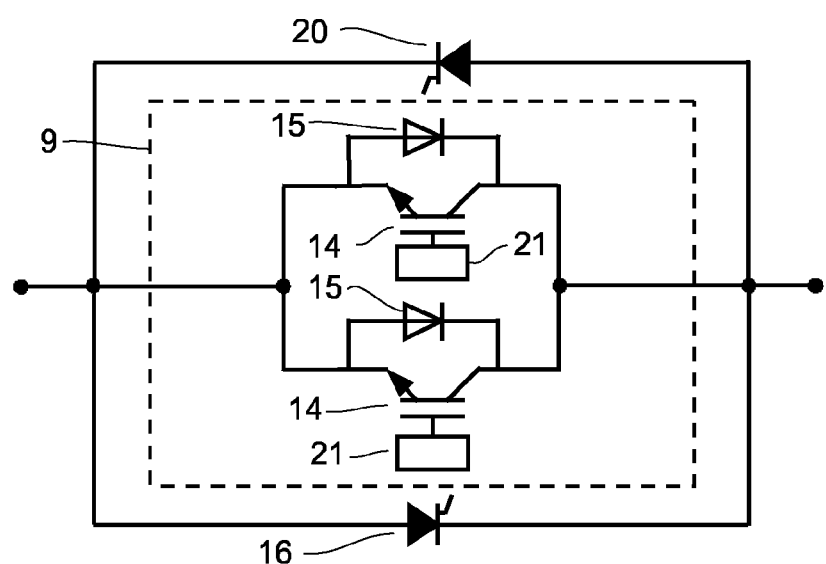
*Figure 2* c

DC POWER SOURCE FOR A HIGH VOLTAGE POWER APPARATUS

CROSS-REFERENCE TO RELATED APPLICATIONS

The present application is a continuation of pending International patent application PCT/EP2009/066865 filed on Dec. 10, 2009 which designates the United States and the content of which is incorporated herein by reference.

FIELD OF THE INVENTION

The present invention relates to a dc power source for a high voltage power apparatus connected to a high voltage electrical power system, the dc power source comprising one or more strings including a plurality of dc power source members connected in series, and switches configured to connect and disconnect the strings. By a high voltage electrical power system should be understood an electrical system within the range of 3 kV and upwards, preferably in the range of 10 kV and upwards. By a dc power source should be understood dc power source members connected in series to be within the range of 3 kV and upwards. With a power apparatus is meant an apparatus that is capable of controlling reactive power and/or active power. Examples of power apparatus are a power compensator and an uninterruptible power supply (UPS).

BACKGROUND OF THE INVENTION

Within flexible alternating current transmission systems (FACTS) a plurality of control apparatus are known. One such FACTS apparatus is a static compensator (STATCOM). A STATCOM comprises a voltage source converter (VSC) having an AC side connected to a high voltage electrical power system and a DC side connected to a temporary electric power storage means such as capacitors. The STATCOM can supply reactive power to or absorb reactive power from the transmission line.

As opposed to the STATCOM, which only compensate for reactive power, another concept is to connect a dc power source to a compact STATCOM, and thus being able to perform active power compensation. The construction may be used e.g. as a spinning reserve and for compensating for fluctuating energy levels in the power system.

Today the dc power source is a high voltage battery. Since the power apparatus is connected to the ac voltage of the high voltage electrical power system, a plurality of battery cells have to be connected in series to match the dc voltage of the power apparatus. Moreover, to obtain the desired active power and duration of the energy storage, a number of strings including a plurality of battery cells must be connected in parallel.

Furthermore, in case of a fault, such as a short-circuit, the power apparatus has to be protected. Consequently, two switches are provided in each string to disconnect the string in case the converter, a string, or a part of the string is short-circuited. One switch is able to disconnect the string from the positive dc rail of the converter and the other switch is able to disconnect the string from the negative dc rail of the converter. Each of the switches has to be rated for the entire converter voltage to be capable of protecting the power apparatus.

Up to now, mechanical dc circuit breakers have been used as switches for connection and disconnection of the strings. However, the availability of dc circuit breakers is limited and the ratings of these breakers are considerably low and less than the required voltage ratings in high voltage electrical power systems. To overcome this problem mechanical ac circuit breakers with some additional circuitry, such as a resonance circuit connected in parallel with the ac circuit breaker, have been used.

A solid-state switch is an electronic switch that, unlike a mechanical breaker, contains no moving parts. There is a desire on the market to be able to exchange the mechanical ac circuit breakers with solid state switches. However, a problem with most of the commercially available solid-state switches is that they become an open-circuit when failed, which means that if the solid-state switch fails, the string which includes the failed switch will be disconnected. As a consequence the dc power source will have its capability significantly reduced.

SUMMARY OF THE INVENTION

It is an object of the present invention to provide an attractive solution to the above mentioned problem.

According to one aspect of the invention this object is achieved by a dc power source for a high voltage power apparatus.

The dc power source according to one embodiment of the invention is characterized in that
one or more strings in the dc power source includes a plurality of dc power source units connected in series and solid-state switches configured to connect and disconnect the strings,
the solid-state switches are distributed among the power source units of each string,
all switches in the string are arranged so that they are turned on and off simultaneously,
each switch is connected in parallel with a first controllable semiconductor in a first direction and connected in parallel with a second controllable semiconductor in a second direction which is opposite to the first direction, and
the dc power source comprises a control unit configured to bypass a failed switch by triggering the forward biased of the first or second controllable semiconductor connected to the failed switch in case a fault in the switch is detected.

An advantage with the dc power source according to the invention is that the resulting current path when a failed switch has been bypassed enables the dc power source to remain in operation as long as redundant switches are available. Another advantage is that the dc power source is more robust and easier to maintain. Moreover, since the solid-state switches are distributed in the string it is possible to reduce the total voltage rating of the switches by 50 percent since in case mechanical dc circuit breakers are used both the breakers must have a breaking capability that equals the entire voltage across the dc power source to be able to disconnect the dc power source from the positive and negative dc rail, respectively.

With a dc power source member is meant a small entity capable of providing dc power, such as a battery cell, a photovoltaic cell, a fuel cell, a flywheel or a super capacitor. Different types of dc power source members could also be combined in the dc power source.

All switches in the string are arranged so that they are turned on and off simultaneously, implying that each switch only has to withstand its corresponding part of the voltage across the dc power source when the string is disconnected. This embodiment reduces the risk for causing over voltages due to some switches turning off earlier than others in the string.

In accordance with an embodiment of the invention, each solid-state switch comprises a controllable semiconductor. The solid-state switch is, for example, an Insulated-Gate Bipolar Transistor (IGBT).

In accordance with an embodiment of the invention, each switch is provided with a gate control unit configured to detect a fault in the switch and to bypass the switch by triggering the forward biased of the first or second controllable semiconductor connected to the switch upon detecting a fault in the switch.

In accordance with an embodiment of the invention at least one of the first and second controllable semiconductor comprises a thyristor. Alternatively, at least one of the first and second controllable semiconductor is an Insulated-Gate Bipolar Transistor (IGBT).

In accordance with an embodiment of the invention, the dc power source members are battery cells. By using battery cells as dc power source members it is possible to charge the high voltage dc power source with energy at occasions when there is excessive power available in the high voltage electrical power system, to be used at other occasions when there is a deficit of power in the system.

When a series-connection, for example such as the string described above, comprises a plurality of solid-state switches it is a desired feature that failing solid-state switches become stable short-circuits rather than open circuits. By this feature the remaining system can continue operating, even though one or more switches have failed, as long as one or more redundant switches are provided. Most of the commercially available semiconductor switches, such as ABB HiPak™ IGBT modules, become an open-circuit when failed. Thus, such economic devices have to date been unsuitable for systems and in applications were series connection of devices is required. Nevertheless, such IGBT devices, despite being an open-circuit when failed, are widely used for traction and industrial applications and as a result the costs are considerably lower than short-circuit failure mode devices such as StakPak™ IGBT Press-Packs. By short-circuit failure mode devices is meant devices which have an inherent ability to conduct in the failed (shorted) state. Further, in some products a plethora of functionalities and intelligence have been integrated in the modules, e.g. over-current protection, thermal protection, current chopping e.t.c.

An advantage with the present invention is its ability to combine the advantageous properties of the IGBT devices being an open-circuit when failed mentioned above with those advantageous properties related to solid-state switches that become stable short-circuits.

In accordance with an embodiment of the invention each switch comprises a plurality of interconnected controllable semiconductors. One example of a plurality of interconnected controllable semiconductors is a plurality of controllable semiconductors connected in series. This feature makes it possible to use controllable semiconductors with current ratings that are high enough even though its voltage ratings are below the requisite. Alternatively, the plurality of interconnected controllable semiconductors is a plurality of controllable semiconductors connected in parallel. This feature makes it possible to use controllable semiconductors with voltage ratings that are high enough even though its current ratings are below the requisite.

According to another aspect of the invention this object is achieved by a method for control and supervision of a dc power source.

Such a method may comprise the following steps:
measuring the voltage over each switch,
detecting whether the voltage over any of the switches is above a threshold value, and
performing a bypass of the switch upon detecting that the voltage over said switch is above a threshold value, by triggering its forward biased first or second controllable semiconductor.

According to another embodiment of the invention the method further comprises the step:
disconnecting a string which includes the switch when the triggered controllable semiconductor is turned-off.

BRIEF DESCRIPTION OF THE DRAWINGS

The present invention will be more fully described by way of example with reference to the accompanying drawings in which:

FIG. 2A shows a schematic figure of a solid-state switch and parallel-connected thyristors;

FIG. 2B shows a schematic figure of a solid-state switch comprising two controllable semiconductors connected in series and parallel-connected thyristors; and FIG. 2C shows a schematic figure of a solid-state switch comprising two controllable semiconductors connected in parallel and parallel-connected thyristors.

DETAILED DESCRIPTION OF THE INVENTION

Figure 1:
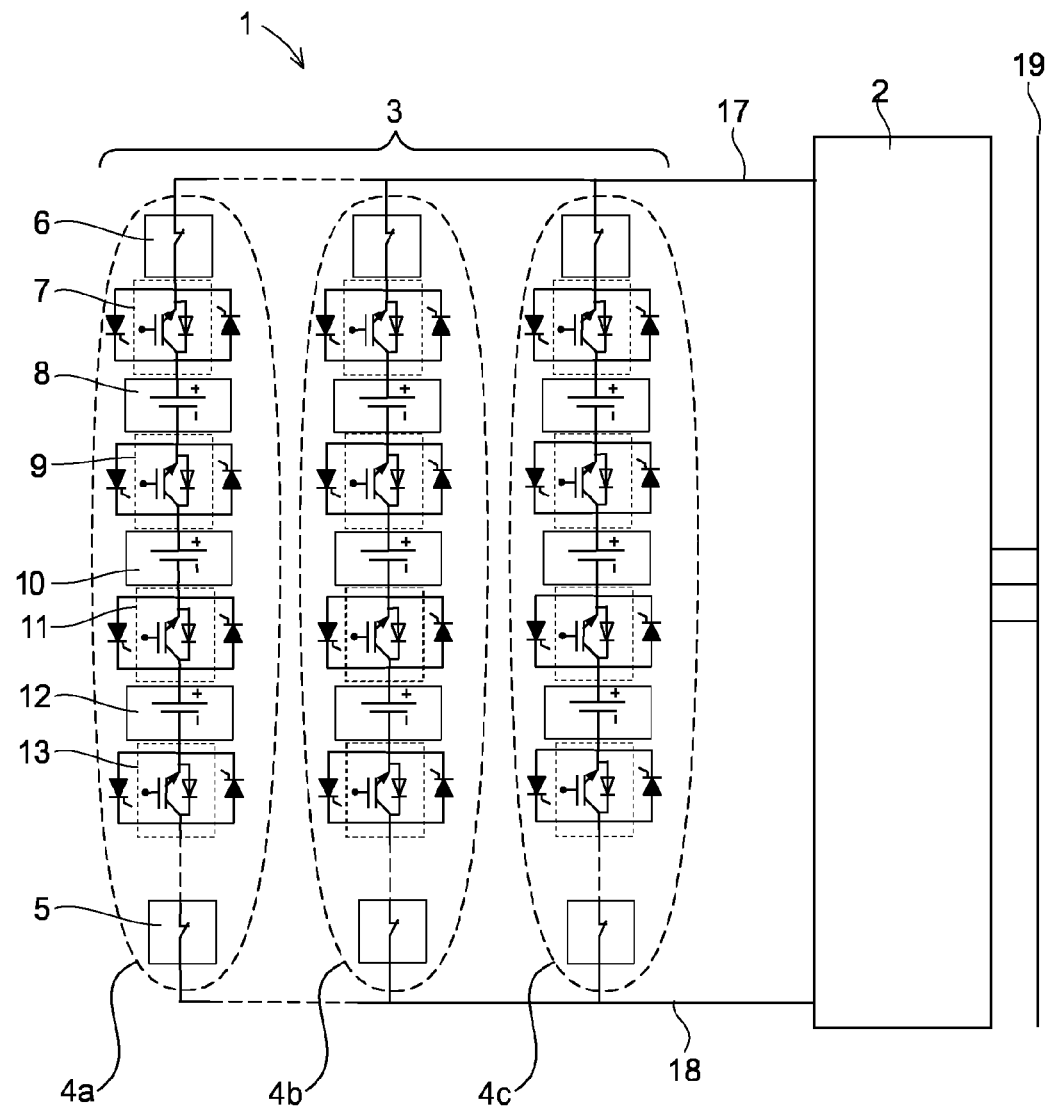
FIG. 1 shows an embodiment of a dc power source in accordance with the present invention.

An example of a dc power source according to the invention is illustrated in FIG. 1. FIG. 1 shows a dc power source 3 for a high voltage power apparatus 1 connected to a high voltage electrical power system 19 according to an embodiment of the invention. Examples of high voltage power apparatus are a power compensator and an uninterruptible power supply (UPS). High voltage electrical power systems can be networks for transmission or distribution of electrical energy as well as industries, hospitals and such. The same reference numerals are used throughout the figures for same or corresponding parts. The power apparatus 1 comprises a high voltage dc power source 3 and a voltage source converter 2. To be able to produce and absorb not only reactive power but also active power, the dc power source 3 is connected to the dc side of the voltage source converter 2. The ac side of the converter is connected to the high voltage electrical power system 19.

The dc power source 3 comprises one or more strings 4a-c connected in parallel, the number of strings depending on the desired amount of active power. In the example illustrated in FIG. 1, three strings 4a-c are shown. Each string 4a-c comprises a plurality of dc power source units 8, 10, 12. The dc power source units 8, 10, 12 in turn comprises a plurality of series-connected dc power source members (not shown in FIG. 1). The total number of dc power source members in each string 4a-c depends on the voltage level of the voltage source converter 2 to which they are connected and the voltage level of the dc power source members used in the string 4a-c. The dc power source members can be of different types, such as battery cells, photovoltaic cells, fuel cells and super capacitors. These different types could also be combined.

In each string 4a-c a plurality of solid-state switches 7, 9, 11, 13 are distributed among dc power source units 8, 10, 12. Examples of solid-state switches are IGBTs, GTOs, IGCTs and MOSFETs. Each dc power source unit 8, 10, 12 is provided with a solid-state switch 9, 11, 13 configured to connect and disconnect the corresponding dc power source unit 8, 10, 12. The voltage of the dc power source units 8, 10, 12 is adapted to be below the breaking capability of the switches 9, 11, 13. All switches 7, 9, 11, 13 in the string are arranged so that they are turned on and off simultaneously, implying that each switch 7, 9, 11, 13 only has to withstand the voltage over its corresponding dc power source unit 8, 10, 12 when the string 4a-c is disconnected.

Each switch 7, 9, 11, 13 comprises a controllable semiconductor, in this embodiment a transistor 14 having collector, an emitter and a gate, and a rectifying member, in this embodiment a diode 15, which is connected in anti-parallel with the transistor 14, which makes it possible to charge the dc power source with power from the high voltage electrical power system 19 whenever excessive power is available. Connected to the gate of the transistor 14 is a gate control unit 21 (not shown in FIG. 1). The gate control unit 21 controls the current through the transistor 14 and is therefore able to turn the switch on (connect) or off (disconnect). In parallel with the switch is a first and second controllable thyristor 16, 20 connected. The first controllable thyristor 16 is connected in a first direction and the second controllable thyristor 20 is connected in a second direction which is opposite to the first direction. In case a fault in the switch 7, 9, 11, 13 is detected by the gate control unit, the gate control unit performs a bypass of the failed switch by triggering the forward biased of the first 16 or second 20 thyristor connected to the failed switch 7, 9, 11, 13. Alternatively, a control unit which is common to several or all switches in the string or even the entire dc power source can be used.

To be able to connect and disconnect the strings, the number of remaining switches (not yet failed) has to exceed a certain amount depending on the voltage level of the dc power source and the breaking capability of the remaining switches. For this reason each string preferably comprises one or more redundant switches enabling the dc power source to remain in operation despite failed switches.

It is preferable to disconnect the strings 4a-c from the converter 2 prior to service and maintenance on the dc power source 3 or on the converter 2, as well as during faults. However, a short-circuit current occurring internally, inside the dc power source units 8, 10, 12, may occur. Due to the fact that the switches 9, 11, 13 are distributed along the string 4a-c, the risk of internal short-circuits will be decreased and the internal short-circuits still occurring within a dc power source unit 8, 10, 12 will give lower short-circuit currents since the number of series-connected dc power source members will be lower.

In case of a short-circuit between the negative side of the dc power source unit 8 closest to positive dc rail 17 and the dc rail 17 itself, a switch 7 is necessary in the path of the short-circuit current to be able to disconnect the dc power source unit 8. Thus, an extra switch 7 has been connected to the positive side of the dc power source unit 8, as shown in FIG. 1. The switch 7 also has a function as a redundant switch in case another switch 9, 11, 13 in the string fails.

Disconnectors 5, 6 are placed in the strings next to the positive dc rail 17 and in the strings next to the negative dc rail 18. The disconnectors 5, 6 can be advantageous for security reasons during maintenance work on the dc power source 3 or on the converter 2. It would also be possible to distribute a plurality of smaller disconnectors along each string analogously to the distribution of the switches 7, 9, 11, 13.

In FIG. 2a a schematic diagram of the solid-state switches 7, 9, 11, 13 and parallel-connected thyristors (16, 20) is shown. Connected to the gate of the transistor 14 is the gate control unit 21. The gate control unit controls the transistor 14 by varying the voltage between the gate and emitter, thereby controlling the resistance between the collector and the emitter and, thus, the current through the transistor 14 at a certain voltage can be determined.

In FIG. 2b a switch 7, 9, 11, 13 comprising two controllable semiconductors 14 connected in series and parallel-connected thyristors (16, 20) is shown. It is however possible to connect three or more such semiconductors 14 in series. Using a series connection makes is possible to use semiconductors with lower voltage ratings than otherwise feasible.

In FIG. 2c a switch 7, 9, 11, 13 comprising two controllable semiconductors 14 connected in parallel and parallel-connected thyristors (16, 20) is shown. It is however possible to connect three or more such semiconductors 14 in parallel. Using a parallel connection makes is possible to use semiconductors with lower current ratings than otherwise feasible.

What is claimed is:

1. A dc power source for a high voltage power apparatus, the dc power source comprising:
one or more strings including a plurality of dc power source units connected in series, and switches configured to connect and disconnect the strings, characterized in that said switches are solid-state switches distributed among the power source units of each string,
all solid-state switches in the string are arranged so that they are turned on and off simultaneously,
each switch is connected in parallel with a first controllable semiconductor in a first direction and connected in parallel with a second controllable semiconductor in a second direction which is opposite to the first direction, and
the dc power source comprises a control unit configured to bypass a failed switch by triggering the forward biased of the first or second controllable semiconductor connected to the failed switch in case a fault in the switch is detected.

2. The dc power source according to claim 1, characterized in that each switch is provided with a gate control unit configured to detect a fault in the switch and to bypass the switch by triggering the forward biased of the first or second controllable semiconductor connected to the switch upon detecting a fault in the switch.

3. The dc power source according to claim 1, characterized in that the dc power source units comprise series-connected battery cells.

4. The dc power source according to claim 1, characterized in that each switch comprises a plurality of interconnected controllable semiconductors.

5. A method for control and supervise of a dc power source, the dc power source comprising:
one or more strings including a plurality of dc power source units connected in series, and switches configured to connect and disconnect the strings, characterized in that said switches are solid-state switches distributed among the power source units of each string,
all solid-state switches in the string are arranged so that they are turned on and off simultaneously,
each switch is connected in parallel with a first controllable semiconductor in a first direction and connected in parallel with a second controllable semiconductor in a second direction which is opposite to the first direction, and
the dc power source comprises a control unit configured to bypass a failed switch by triggering the forward biased of the first or second controllable semiconductor connected to the failed switch in case a fault in the switch is detected,
characterized in that the method comprises:
measuring the voltage over each switch, detecting whether the voltage over any of the switches is above a threshold value, and performing a bypass of the switch upon detecting that the voltage over said switch is above a threshold value, by triggering its forward biased first or second controllable semiconductor.

6. The method according to claim 5, characterized in that the method further comprises:

disconnecting a string which includes the switch when the triggered controllable semiconductor is turned-off.

* * * * *